United States Patent [19]

Stillhard et al.

[11] 4,191,726

[45] Mar. 4, 1980

[54] PROCESS AND APPARATUS FOR MANUFACTURING MOLDED PARTS FROM GRANULATED PLASTIC MATERIALS

[75] Inventors: Bruno Stillhard, St. Gallen; Hans Näf, Wil, both of Switzerland

[73] Assignee: Gebrueder Buehler AG, Switzerland

[21] Appl. No.: 887,553

[22] Filed: Mar. 17, 1978

Related U.S. Application Data

[62] Division of Ser. No. 809,680, Jun. 24, 1977, Pat. No. 4,158,540.

[51] Int. Cl.$^2$ .............................................. B29F 1/08
[52] U.S. Cl. .................................. 264/517; 264/121; 264/123; 264/126; 264/329
[58] Field of Search ....... 264/121, 126, 329, DIG. 65, 264/127, 123, 517, DIG. 10, DIG. 83; 425/547, DIG. 39

[56] References Cited

U.S. PATENT DOCUMENTS

| | | | |
|---|---|---|---|
| 3,139,466 | 6/1964 | Couchman | 264/121 X |
| 3,162,703 | 12/1964 | Eyles | 264/329 X |
| 3,166,615 | 1/1965 | Farrell | 264/123 X |
| 3,263,278 | 8/1966 | Hendry | 425/547 X |
| 3,299,475 | 1/1967 | Carlson | 264/329 X |
| 3,351,978 | 11/1967 | Kraus | 264/DIG. 10 |
| 3,829,542 | 8/1974 | De Romano | 264/123 X |
| 3,879,515 | 4/1975 | Morita | 264/123 |

*Primary Examiner*—Thomas P. Pavelko

*Attorney, Agent, or Firm*—McGlew and Tuttle

[57] ABSTRACT

A process of manufacturing molded parts using a mold with relatively movable parts enclosing a mold cavity which is fed with plasticizable material, comprises directing grains of the plasticizable material into a vertically elongated vestibule having a lower end connected to the feed of the mold cavity and directing hot gases into the lower end of the vestibule and upwardly through the plasticizable material therein to make the material weldable and, thereafter, directing the weldable material into the cavity under pressure. The device for carrying out the process includes a feed conduit which is connected into the cavity which is disposed below a vertically elongated vestibule which has a closed top and a bottom opening into the conduit. The vestibule includes an upper substantially cylindrical first zone portion, a lower substantially cylindrical third zone portion, of a smaller diameter than the upper first zone portion, and an intermediate second zone portion interconnecting the first and third zone portions which is of frusto-conical configuration. The granular material is fed into the intermediate zone of the vestibule and hot gases are circulated to the lower end of the bottom third zone portion and upwardly through the material in each of the zones and out through the top of the first zone portion. A ram is movable in the feed conduit to direct the weldable plastic material into the mold cavity defined between the two mold parts.

8 Claims, 1 Drawing Figure

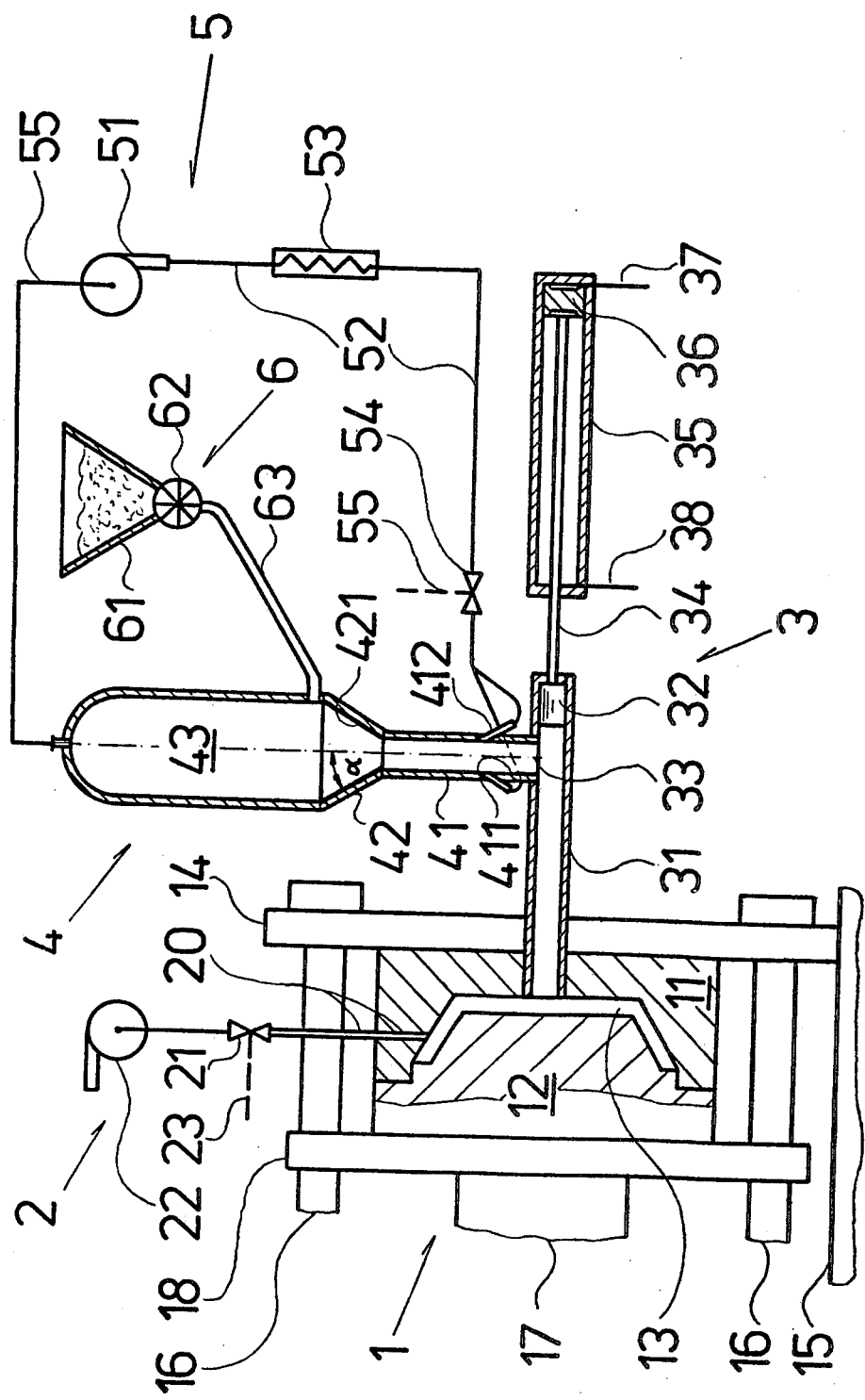

PROCESS AND APPARATUS FOR MANUFACTURING MOLDED PARTS FROM GRANULATED PLASTIC MATERIALS

This is a division of application Ser. No. 809,680 filed June 24, 1977, now U.S. Pat. No. 4,158,540.

FIELD AND BACKGROUND OF THE INVENTION

This invention relates in general to the construction and operation of plasticizing devices and, in particular, to a new and useful process and apparatus for the manufacture of molded parts from granulated plastics wherein the granular plastic material is fed into a vertically elongated vestibule through which hot gases are circulated upwardly through the plastic materials or after wetting the granular material with a reactive monomeric preproduct, it is subjected to a surface polymerization and subsequently the plastic pile becomes weldable and it is abruptly pressed into the mold cavity using a movable ram.

DESCRIPTION OF THE PRIOR ART

A process recently introduced to the trade makes it possible, owing to the low thermal conductivity of plastics, to manufacture thick-walled molded parts with wall thicknesses of over 10 mm economically. According to this impact-sintering process, the heat which is necessary for welding the grains of a pile required for one molded part is introduced into the granulated raw material by a brief overheating of the grain surfaces by means of a hot gas. After the surface layer of the grains has been heated beyond the melting temperature, the core of the grains remains cold and the entire pile is sintered together by abrupt pressing into a mold cavity.

Because of the relatively small quantity of heat supplied to the individual plastic grains, a temperature equalization will take place rapidly between their surface and core after their sintering together. In addition, the short cooling time is independent of the wall thickness of the molded part. At shortened standing times, molded parts of low shrinkage and improved strength result.

The manufacture of molded parts from heat-resistant plastics may occur with the aid of this process directly in that, during the pressing, a polymerization along the grain boundaries takes place. For this purpose, the fully polymerized granulated plastic having a grain size of between about 0.1 mm and 10 mm is first wetted with a reactive liquid monomer. Then a brief heating of the wetted granulated material by a hot gas follows in which the monomer begins to wet the grain surface. At this point, the pile is pressed. Heat-resistance molded parts with low shrinkage and increased strength at shortened standing times can thereby be obtained, making it possible to avoid the previously customary detour through the pressing of blanks and their chip-removing machining.

The speeds and pressures customary in plastics injection molding, applied in the described process for the pressing of the weldable granulated material, prove sufficient, particularly at higher flow path to wall thickness ratios.

It is the object of the present invention to provide an improved process by means of which dimensionally true as well as thick-walled molded parts with uniformly dense structure and smooth surface can be manufactured rapidly and at a high flow path to wall thickness ratio.

According to the invention, the solution of this problem is characterized by carrying out the pressing at speeds and/or pressures corresponding to those in metal pressure casting. The kinetic energy, increasing with the square of the press-in speed can, together with the higher end pressure, and despite the existing greater flow resistances, ensure the necessary densification of the molded part structure, so that the gas escapes from the compressed interstices and the plastic grains weld together.

An intensive plasticizing and/or polymerization process can be initiated most expediently in a so-called bubble layer, into which the hot gas flowing to the vestibule under pressure also dissolves the plastic pile metered in. The grain surfaces can thereby be freely exposed on all sides to the action of the hot gas along the long trajectories of the grains. An additional intensification of the welding effect improved by the increased kinetic energy is obtainable by application of the injection stamping ("Spritzpräge") method. The hollow mold, which at the beginning of the press-in movement is still slightly open, can be closed as the mold filling comes to an end. In certain cases, it may be of further advantage to press the weldable plastic pile into an evacuated mold cavity.

The invention further relates to an apparatus for the practice of the process including a closable hollow mold, a vestibule connectable with the mold cavity thereof, a plastics metering device for metering a plastics pile for one molded part each time into the vestibule, a hot gas supply device, and a cylinder-piston assembly for pressing the plastics pile, rendered weldable, into the mold cavity.

Apparatus has been proposed for the accomplishment of the impact sintering process introduced above. Such apparatus essentially comprises a hollow mold, a tool vestibule, and a feeding screw with a screw head designed as the press piston. These parts are arranged on a frame, aligned with one another, in such a way that the tool vestibule lying between the hollow mold and feed screw can be traversed by the screw head in the direction of the hollow mold and back. The tool vestibule is formed with diametrically opposite porous wall portions, through which a hot air stream can be generated at right angles to the lift direction of the screw head. To eliminate the undesired plasticizing effect at the feed screw, its housing bore is widened in the zone of the screw head. In the back wall of the hollow mold, away from the tool vestibule, a counter-ram is guided, which is also displaceable into the tool vestibule.

During the plastification of one plastics pile each time, which previously passes through the feed screw into the tool vestibule, through the hot air stream, the vestibule is kept closed, on the one hand, by the screw head in the retracted position and, on the other hand, by the counter-ram remaining in its extended position. The counter-ram thus separates the mold cavity from the tool vestibule in the plastification phase.

After the grain surfaces have been heated beyond the melting temperature, the hot air stream is turned off and the feed screw is chased through the tool vestibule head-first as the pressing ram. The pressing in of the plastics pile into the mold cavity occurs with the simultaneous pushing back of the counter-ram. The cooling period being over, the feed screw retracted and the mold opened, the counter-ram ejects the molded part.

A disadvantage of this apparatus resides in that the feed screw, together with its drive as a pressing ram, which is customary in plastic injection molding machines, is relatively slow, and the compression pressure exerted at the end of the press-in stroke is often insufficient. Another disadvantage is that a counter-ram is necessary, which during the press-in movement, exerts a braking counter-force. The fact that the molded part is compressed essentially between the screw head and the counter-ram permits only simple molded parts to be made with this apparatus.

A further disadvantage is that the geometry of the tool vestibule and the arrangement of the flow cycle for the hot air permits the formation of a turbulence layer with only a relatively narrow clearance for the movement of the single grains. The latter are therefore accessible to the action of the hot air only in a limited degree. This may result in an incomplete plastification of the plastics pile.

SUMMARY OF THE INVENTION

The present invention provides an apparatus which overcomes the disadvantages of the known arrangement. According to the invention, the apparatus is characterized in that, to increase the press-in speed or the press-in pressure compared with those of a plastics injection device, between the vestibule and the mold cavity, a pressing unit, similar to the shot unit of a cold-chamber pressure casting machine, is provided. The thus constituted pressing unit with its pressing power far exceeding that of a conventional plastics injection device permits short cycle times in the production of the molded parts, despite the ever more complicated molded-part and, hence, mold cavity design according to modern requirements.

By the massive increase in speed and/or pressure, the factors of molded-part quality, which of course depend on these parameters, can be favorably influenced. At good dimensional accuracy and smooth surface of the molded parts, no density fluctuations, defects or gas inclusions are to be expected in their structure. The use of a counter-ram is superfluous in the apparatus according to the invention.

To be able to carry out an effective plastification and/or polymerization of the grain surfaces rapidly, initiated in the vestibule by the hot gas supplied thereto under pressure simultaneously in the totality of the plastics pile metered in, there is advantageously associated with the filling aperture of the pressing unit, a vestibule composed of three zones.

A first cylindrical vestibule zone is advantageously in connection at its one end with the filling aperture of the pressing unit, at its other end with the entrance aperture of equal diameter of a second conical zone, and at its generated surface, with the pressure side of the hot gas supply device. The second conical zone may connect by its exit aperture having the largest diameter with the third likewise cylindrical zone of equal diameter, the latter being connected in this coupling region with the plastics metering device and at its end away from the second zone with the intake side of the hot gas supply device.

It is advisable to connect the pressure side of the hot gas supply device to the first vestibule zone via several openings, the openings permitting distribution on the cylinder surface thereof symmetrically on the same level, inclined toward the jacket surface, and directed toward the jacket surface, and directed toward the second conical zone. Expediently, the axial length of the first vestibule chamber between the openings and the second zone is selected equal to three times the diameter of the first zone. The angle of inclination of the conical wall of the second vestibule zone portion in respect to the longitudinal axis thereof is selectable between a lower limit value of 15° and an upper limit value of 30°, depending on the friction value of the granulated plastic.

The measures described permit the dissolution of the plastics pile present in the vestibule into a bubble layer in which the surfaces of all grains can be subjected to the plasticizing and/or polymerization process simultaneously. The inner face of the second conical vestibule zone may be provided with a slippage lining to prevent adhesion of the plastics grains. The pressure cylinder of the pressing unit is advantageously designed up to its opening into the mold cavity with a constant inner cross-sectional area. The pressure face of the pressing units is advantageously designed up to its opening into the mold cavity with a constant inner cross-sectional area. The pressure face of the pressing ram movable therein can then assume after completed press-in stroke the role of a mold portion so-defining the molded part.

It is advisable in many cases to provide a venting device connecting with the mold cavity.

A simple hot gas supply device may comprise a blower, a pressure pipe leading from the pressure side thereof to the openings in the generated surface of the first vestibule zone, and a suction pipe extending from the third vestibule zone to the intake side of the blower, and a heating device may be arranged in the pressure pipe, traversed by the pressure medium and a shut-off valve.

In the event the hot gas supply device forms a closed circulation system, at least one bucket wheel and a down pipe extending from the latter into the third cylindrical vestibule zone may be used as the plastics metering device. It may prove advantageous as well to arrange the opening of the down pipe in the coupling region of the third and second vestibule zones tangential to the cylindrical jacket of the third vestibule zone.

An object of the invention is to provide a process of manufacturing molded parts using a mold with relatively movable parts enclosing a mold cavity which is fed with plasticizable material and which comprises directing the grains of plasticizable material into a vertically elongated vestibule having its lower end connected to the feed of the mold cavity, and directing hot gases into the lower end of the vestibule and upwardly through the plasticizable material to make the material weldable, and thereafter, directing the weldable material into the cavity under pressure.

Another object of the invention is to provide a device for manufacturing molded parts, comprising a mold having first and second relatively movable parts defining a mold cavity therebetween, and which includes a feed conduit connected into the cavity and has a ram displaceable in the feed cavity for advancing the material therein and which also includes a vertically elongated vestibule having a closed top and a bottom opening into the conduit and defining on its interior and upper substantially cylindrical first zone portion, a lower substantially cylindrical third zone portion of a smaller diameter than the first zone portion, and an intermediate second zone portion interconnecting the first and third zone portions wherein hot gases are circulated upwardly from the lower end of the vestibule through the top thereof to weld the plasticizing material and to feed it into the conduit connected into the mold cavity and which also includes a ram for directing the material in the conduit into the mold cavity.

A further object of the invention is to provide a device for preheating plastic granular material prior to its being delivered into a mold cavity of a plasticizing machine, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

The only FIGURE of the drawing is a schematic partial sectional view of a plasticizing device constructed in accordance with the invention.

DESCRIPTION OF THE PREFERRED EMBODIMENT

Referring to the drawing in particular, the invention embodied therein, comprises a mold 1 which includes a movable mold part 12 and a fixed mold part 11. Mold 1 includes a venting device 2 including a blower 22 for venting a mold cavity 13. A pressing unit 3 includes a ram 32 movable in a pressing cylinder or connecting conduit 31 to advance the plasticizing material into the mold cavity. Granular plasticizing material is fed from a bunker or feed funnel 61 into a vestibule, generally designated 4, where it is pretreated before it is delivered into the pressure cylinder and advanced into the cavity 13 by the ram 32. The feed funnel 61 is part of a plastic metering device 6. Hot gases are supplied from a hot gas supply device 5 to the vestibule 4 for pretreating the plastic material therein.

The mold 1 comprises a fixed mold half 11 and a movable mold half 12 which, in the closed state of mold 1, enclose a mold cavity 13. Fixed mold half 11 is secured to fixed mold support 14. Support 14 is anchored on a machine frame 15 and it is connected by means of columns 16 with a fixed bracket (not shown) which receives a drive (also not shown) for the closing and opening of the mold. The mold closing drive is in connection through a drive member, such as a rod 17, with a mold support 18 displaceable along the columns 16, on which mold support, the movable mold half 12 is mounted.

A vent passage 20 is provided in the fixed mold half 11 by way of which the mold cavity 13 can be connected by means of a vent valve 21 with a vent blower 22. A remote control connection to the machine control has been indicated by the control connection 23 in broken lines at the vent valve 21.

The pressure cylinder 31 of the pressing unit 3 opens through a respective bore of the fixed mold half 11 and of the fixed mold support 14 into the central region of the mold cavity 13. It has a cross-sectional area constant throughout, so that the pressure face of the pressing ram 32 movable therein forms, after completed press-in stroke, a portion of the mold wall codefining the molded part. A filling aperture 33 for the material to be pressed is arranged in the end region of the pressure cylinder 31 away from mold 1.

The pressing ram 32 is in drive connection by a piston rod 34 with a shot piston 36 disposed in an associated hydraulic shot cylinder 35. The operation of the pressing unit 3 occurs through the two pressure lines 37 and 38 which are connectable selectively to a pressure source or, respectively, to a tank by means of control valves, which are known per se and have not been shown.

The vestibule 4 is composed of three zones 41, 42 and 43. The outlet 411 of the first cylindrical vestibule zone 41 is connected gastight to the filling aperture 33 of the pressure cylinder 31 of the pressing unit 3. Above the outflow 411, at the cylinder jacket surface of the first vestibule 41, several openings 412, connected with the pressure side of the hot gas supply device 5, are present, which openings are symmetrically distributed on the same level, inclined toward the jacket surface, and directed toward the second conical vestibule 42. Between the openings 412 and the following second conical vestibule zone 42, the first vestibule zone 41 has an axial length equal to three times its diameter.

The angle of inclination $\alpha$ of the conical wall of the second vestibule zone 42 against the longitudinal axis thereof is 30°. The inner face of this conical wall is provided with a slippage lining.

The second conical vestibule zone 42 connects by its cross-section having the largest diameter with the third likewise cylindrical vestibule zone 43 which is of equal diameter. The latter is in connection in this coupling region with the plastics metering device 6 and, by its end away from the second vestibule zone 42, with the intake side of the hot gas supply device 5. The hot gas supply device 5 consists of a blower 51, whose pressure side is in connection via a pressure pipe 52 with the openings 412 at the first vestibule zone 41. A heating device 53 and a shut-off valve 54 are disposed in the pressure pipe 52. The control connection 55, shown in broken lines at the shut-off valve 54, indicates a remote control connection existing to the machine control.

The intake side of the blower 5 is connected by a suction pipe 55 to the third vestibule zone 43. The plastics metering device 6 is formed by a feed funnel 61 with a bucket wheel 62 provided therebelow and a down pipe 63 extending from the latter to the third vestibule zone 43, the down pipe 63 opening in the coupling region of the third and second vestibule zones 43 and 42 tangentially into the cylindrical jacket of the third vestibule zone 43.

The apparatus illustrated in the drawing permits the following mode of operation:

The granulated material passing from the plastics metering device 6 into the coupling region of the third and second vestibule zones 43 and 42 slides along the conical wall of the second vestibule zone 42 toward the first vestibule zone 41, until it is seized by the massive hot air jet shooting upward from the latter zone. The hot air jet is produced by the blower 51 in the flow cycle formed by the vestibule 4 and the hot gas supply device 5 connected thereto, and is brought to the necessary temperature in the heating apparatus 53. The heating apparatus 53 may be a heat exchanger or an electric heating unit traversed by air.

Across the shut-off valve 54, which was previously opened by means of an instruction signal from the machine control (which has not been shown), and the openings 412, the hot air flows into the first cylindrical vestibule zone 41. By the ratio 1:3 of the axial length of the first vestibule zone 41, between the openings 412 and the second vestibule zone 42, to the diameter of the first vestibule zone 41, a rate of flow can be obtained which is two to three times the sedimentation of the plastic grains.

The balled hot air jet issuing from the first cylindrical vestibule zone 41 into the conically widening second vestibule zone 42 dissolves the granulate pile sliding down along the wall of the latter into a bubble layer. The plastic grains are hurled up in a central stream against the cover of the third cylindrical vestibule zones 43, whereby the grain surface is softened by the hot medium.

The raised grains then sink along the periphery of the flow near the chamber wall back again to the cone of the second vestibule zone 42, whose slippage lining 421 prevents adhesion of the grains. The described process is repeated until the grain surfaces of a plastic pile metered into the vestibule 4, which is necessary for the production of a molded part, are all plasticized, or respectively, in the case of granulate wetted with a liquid monomer, a surface polymerization is initiated. The latter process permits the direct production of molded parts from heat-resistant plastics, the polymerization temperature being lower, as is known, than the plastification temperature. For the rapid metering of the granulated material into the vestibule 4, the plastics metering device may have several bucket wheels 62.

After the plastic pile contained in vestibule 4 has been made weldable, the supply of the hot air stream is interrupted by closing the shut-off valve 54 on the basis of a shutting instruction given from the machine control. If, for example, an appropriately designed electric drive motor is chosen, the blower 51 can continue to run during the short shut-off time. Due to the interruption of flow, the bubble layer collapses and the plastic pipe falls through the filling aperture 33 into the pressure cylinder 31 of the pressing unit 3.

The pressing ram 32 of the latter had been previously pulled back into its starting position by pressurization of its shot piston 36 by means of control valves (not shown) via the pressure line 38 from the piston rod-side pressure chamber of the shot cylinder 35. Simultaneously, the closing of mold 1 is effected by means of the mold closing drive (not shown) connected to the rod 17.

After the filling of the weldable plastic pile into the pressure cylinder 31, the full pressure face of the shot piston 36 is also pressurized by means of the control valves, via the pressure line 37. The differential force between the full and the piston rod-side pressure face of the shot piston 36 moves the piston together with the pressing ram 32 relatively slowly against the mold cavity 13, until the ram pushes the granulated material ahead of itself and closes the filling aperture 33. At this point, the control connection 23 opens the venting valve 21, so that the mold cavity 13 is evacuated by the venting blower 22.

After a possible brief dwell of the pressing ram 32 and subsequent pressure relief of the piston rod-side pressure chamber of the shot cylinder 35 via the pressure line 38, the weldable granulated plastic is pressed abruptly into the mold cavity 13, the venting valve 21 being closed by means of a closing instruction from the machine control through control connection 23.

Due to the pressing unit 3, which operates at press-in velocities and/or pressure which correspond to those in metal pressure casting, the plastic grains fill the mold cavity 13 evenly and quickly and also at high flow path-to-wall thickness ratios and weld together without air inclusions, collapsed areas and with little shrinkage. Dimensional accuracy, surface quality and mechanical strength can thereby be increased.

To enhance the welding effect further, the hollow mold 1 which is still open a few millimeters before shot start, is closed at the end of the press-in process.

The cooling time necessary for stripping the molded part and hence also the standing time of the machine are short in comparison to those in conventional injection molding and independent of the wall thickness.

While a specific embodiment of the invention has been shown and described in detail to illustrate the application of the principles of the invention, it will be understood that the invention may be embodied otherwise without departing from such principles.

What is claimed is:

1. A process for the manufacture of molded parts from granulated plastic, wherein the surface of the grains of the plastic pile required for one molded part is wet with a reactive monomeric preproduct and is subjected to a surface polymerization in a thin layer in a vestibule, which is connected to a mold cavity, by a hot gas supplied thereto to make it weldable with the cores of the grains remaining cool and solid and, subsequently, the surface of the grains having become weldable, the plastics pile is abrubtly pressed into the mold cavity of a hollow mold by an impact-like pressing at sufficient pressing speed and, upon termination of the compressive motion, a sufficient pressure is applied to the mold cavity, so that the plastics pile is sintered.

2. A process for the manufacture of molded parts from granulated plastics, wherein the surface of the grains of the plastic pile is required for one molded part is plasticized in a thin layer in a vestibule, which is connected to a mold cavity by a hot gas supplied thereto, the cores of the grain remaining cold and unplasticized, and subsequently, the surface of the grains having become weldable, the plastics pile is abruptly pressed into the mold cavity of the hollow mold by an impact-like pressing and sufficient pressing speeds and, upon termination of the compressive motion, a sufficient pressure is applied to the mold cavity, so that the plastics pile is sintered.

3. A process for the manufacture of molded parts using a mold with relatively movable mold parts enclosing a mold cavity which is fed with a plasticizable material and using a granular plastics pile required for one molded part, comprising plasticizing the surface of the grains of the plastic pile in a vestibule which is connected through the wall of a die casting unit to the mold cavity by directing hot gas therethrough with the cores of the grains remaining unplasticized, whereby the plastics pile is caused to form a bubble layer in the vestibule so as to make the surface of the grains weldable rapidly and uniformly, after the surface of the grains become weldable, roughly pressing them into the mold cavity with an impact-like pressing, and, upon termination of the compressive motion, subjecting the molding in the cavity to a pressure, the pressing speed and pressure being sufficient to sinter the grains together.

4. A process for manufacturing molded parts, according to claim 3, wherein a bubble layer is formed and the mold parts are still slightly open at the beginning of the press-in movement and including closing the mold parts as the filling comes to an end.

5. A process of manufacturing molded parts, according to claim 3, wherein the mold cavity is evacuated during the pressing of the weldable plastic material into the mold cavity.

6. A process for the manufacture of molded parts using a mold with relatively movable mold parts enclosing a mold cavity which is fed with a plasticizable material and using a granular plastics pile required for one molded part, comprising wetting the surface area of the grains of the one molded part plastics pile with a reactive monomeric preproduct and subjecting the wet surface of the grains to a surface polymerization in a thin layer in a vestibule which is connected through the well of a metal die casting unit to the mold cavity by directing hot gas therethrough with the cores of the grains remaining cold and solid, whereby the plastics pile is caused to form a bubble layer in the vestibule so as to make the surface of the grains weldable rapidly and uniformly, and, after the surface of the grains becomes weldable, roughly pressing the plastics pile into the mold cavity with an impact exerted by the metal die casting unit at an impact speed and, upon termination of the compressive motion subjecting the mold cavity to a pressure, the impact speed and pressure being sufficient to sinter the grains to form the one molded part.

7. A process of manufacturing molded parts according to claim 6, wherein the mold parts are still slightly open at the beginning of the press in movement and including the step of closing the molded parts as the filling comes to an end.

8. A process of manufacturing molded parts, according to claim 6, wherein the mold cavity is evacuated during the pressing of the moldable plastic material into the mold cavity.

* * * * *